US009343935B2

(12) United States Patent
Mader et al.

(10) Patent No.: US 9,343,935 B2
(45) Date of Patent: May 17, 2016

(54) ROTOR OF A PERMANENTLY EXCITED SYNCHRONOUS MACHINE (71) Applicant: Siemens Aktiengesellschaft, München (DE)

(72) Inventors: Daniel Mader, Bad Neustadt a.d. Saale (DE); Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 397 days.

(21) Appl. No.: 13/962,586

(22) Filed: Aug. 8, 2013

(65) Prior Publication Data

US 2014/0042857 A1 Feb. 13, 2014

(30) Foreign Application Priority Data

Aug. 9, 2012 (EP) ..................................... 12179897

(51) Int. Cl.
*H02K 21/12* (2006.01)
*H02K 1/27* (2006.01)

(52) U.S. Cl.
CPC ..................................... *H02K 1/2773* (2013.01)

(58) Field of Classification Search
CPC .............................. H02K 1/2773; H02K 1/276
USPC ............. 310/156.19, 156.21, 156.23, 156.53, 310/156.56, 216.007, 216.008, 216.065
See application file for complete search history.

(56) References Cited

U.S. PATENT DOCUMENTS

| 5,010,266 A * | 4/1991 | Uchida ................ H02K 1/2773 310/156.22 |
| 5,378,953 A * | 1/1995 | Uchida .................. H02K 21/14 310/156.57 |
| 5,786,650 A | 7/1998 | Uchida |
| 6,208,055 B1 * | 3/2001 | Takahashi ............... G04C 13/11 310/156.36 |
| 2004/0212266 A1 * | 10/2004 | Hans ..................... H02K 1/2766 310/156.56 |
| 2004/0217667 A1 * | 11/2004 | Popov .................... H02K 1/146 310/156.57 |
| 2007/0267930 A1 * | 11/2007 | Ogava .................. H02K 1/2773 310/156.53 |
| 2009/0127961 A1 * | 5/2009 | Pedersen ................ H02K 1/276 310/156.53 |
| 2010/0253171 A1 * | 10/2010 | El-Refaie ............. H02K 1/2773 310/156.53 |
| 2011/0127859 A1 | 6/2011 | Amrhein |

FOREIGN PATENT DOCUMENTS

| DE | 197 23 302 A1 | 12/1998 |
| DE | 20 2005 005 936 U1 | 5/2006 |
| DE | 10 2009 001035 A1 | 8/2010 |
| JP | H 05207690 A | 8/1993 |
| WO | WO 2010/006737 | 1/2010 |

* cited by examiner

*Primary Examiner* — Thanh Lam
(74) *Attorney, Agent, or Firm* — Henry M. Feiereisen LLC.

(57) ABSTRACT

A rotor of a permanently excited synchronous machine includes a shaft capable of rotating about an axis and a laminated core having an axial layering arrangement defined by planes which are aligned perpendicular to the axis. The laminated core has at least two layers of different geometry. A first layer has a plate with a closed outer contour at least at an outer periphery, and a second layer has plural plate segments. The first and second layers of the laminated core are arranged in an axial direction to form axial pockets in interspaces between the plate segments of the second layer and recesses formed radially within the outer contour of the first layer for receiving permanent magnets. An adhesive is provided in radial gaps formed at least in axial sections of the second layer between adjacent plate segments and the permanent magnets.

14 Claims, 7 Drawing Sheets

ROTOR OF A PERMANENTLY EXCITED SYNCHRONOUS MACHINE

CROSS-REFERENCES TO RELATED APPLICATIONS

This application claims the priority of European Patent Application, Serial No. 12179897, filed Aug. 9, 2012, pursuant to 35 U.S.C. 119(a)-(d), the content of which is incorporated herein by reference in its entirety as if fully set forth herein.

BACKGROUND OF THE INVENTION

The present invention relates to a rotor of a permanently excited synchronous machine.

The following discussion of related art is provided to assist the reader in understanding the advantages of the invention, and is not to be construed as an admission that this related art is prior art to this invention.

Permanently excited synchronous machines have permanent magnets in or on their rotor. Various options exist of providing permanent magnets in or on the rotor. A fixing of these permanent magnets is required particularly when permanent magnets are to be arranged within the rotor.

It would therefore be desirable and advantageous to provide an improved rotor for a permanently excited synchronous machine to obviate prior art shortcomings and to exhibit comparatively leakage-resistance while still being easy and robust to manufacture.

SUMMARY OF THE INVENTION

According to one aspect of the present invention, a rotor of a permanently excited synchronous machine includes a shaft capable of rotating about an axis, a laminated core having an axial layering arrangement defined by planes which are aligned perpendicular to the axis, the laminated core including at least two layers which are configured to be geometrically different, with a first one of the layers having a plate with a closed outer contour at least at an outer periphery, and with a second one of the layers having plural plate segments, the first and second layers of the laminated core being arranged in an axial direction to form axial pockets in interspaces between the plate segments of the second layer and recesses formed radially within the outer contour of the first layer, permanent magnets received in the pockets, and an adhesive provided in radial gaps formed at least in axial sections of the second layer between adjacent plate segments and the permanent magnets.

The present invention resolves prior art problems by gluing the permanent magnets to the shaft and/or to the adjacent plates at predeterminable points within the axial pockets. The inventive construction with, when viewed in the axial direction, comparatively relatively few webs in respect of the overall number of plates, which are only provided in the plates with a closed contour, results in a leakage-resistant structure of the rotor. With this inventive structure of a rotor, a comparatively high torque synchronous motor can be produced. Furthermore, the inventive construction also ensures a high rotational speed of the synchronous motor, which also withstands the centrifugal force stresses present in this instance.

It is particularly advantageous that a comparatively easy-to-assemble and easy-to-automate structure of the rotor according to the invention can be produced. In order to further increase the rigidity of the permanent magnets within the pockets, tangential adhesive gaps are also provided in particular between the axial sections of the plate segments and the shaft. Adhesives can thus now be applied both laterally in respect of the permanent magnets and also radially below the permanent magnets.

Such a tangential adhesive gap can advantageously also be formed by a substantially cylindrical sleeve arranged between the shaft and laminated core. The sleeve is hereby co-rotationally coupled to the shaft and the laminated core with its plates is positioned on this sleeve. In particular the plates for positioning and fixing of the laminated core are hereby moved into slots provided on the sleeve. As a result, tangential adhesive gaps are realized in addition to the radial adhesive gap.

According to another advantageous feature of the present invention, the permanent magnets can be arranged in a flux concentration direction within the rotor, which only makes sense from a technical point of view when the rotor has a number of poles 2p>10. Only then can a flux concentration develop.

According to another advantageous feature of the present invention, the lateral surface of the cylindrical sleeve can have axial webs and in the peripheral direction. When the rotor is assembled, the necessary adhesive gaps are thus formed.

According to another advantageous feature of the present invention, the permanent magnets may have a trapezoid cross-section to thereby realize the flux concentration. The narrower side of this cross-section points hereby either in the direction Of the outer contour of the rotor or in the direction of the shaft.

Of course, permanent magnets with a rectangular cross-section may be inserted into correspondingly embodied pockets as well.

In order to define the adhesive gaps, annular grooves running in the peripheral direction can be provided on the shaft as an alternative. The annular grooves thus likewise define tangential adhesive gaps between the permanent magnet and the shaft.

The mechanical structure of the rotor is best suited for ferrite magnets, which are preferably arranged in a flux concentration direction. In accordance with the invention, a flux line density can be realized, comparable to rare-earth magnets, in the air gap of the dynamoelectric machine, without having to take into account losses in terms of the rotational speed and efficiency of the machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
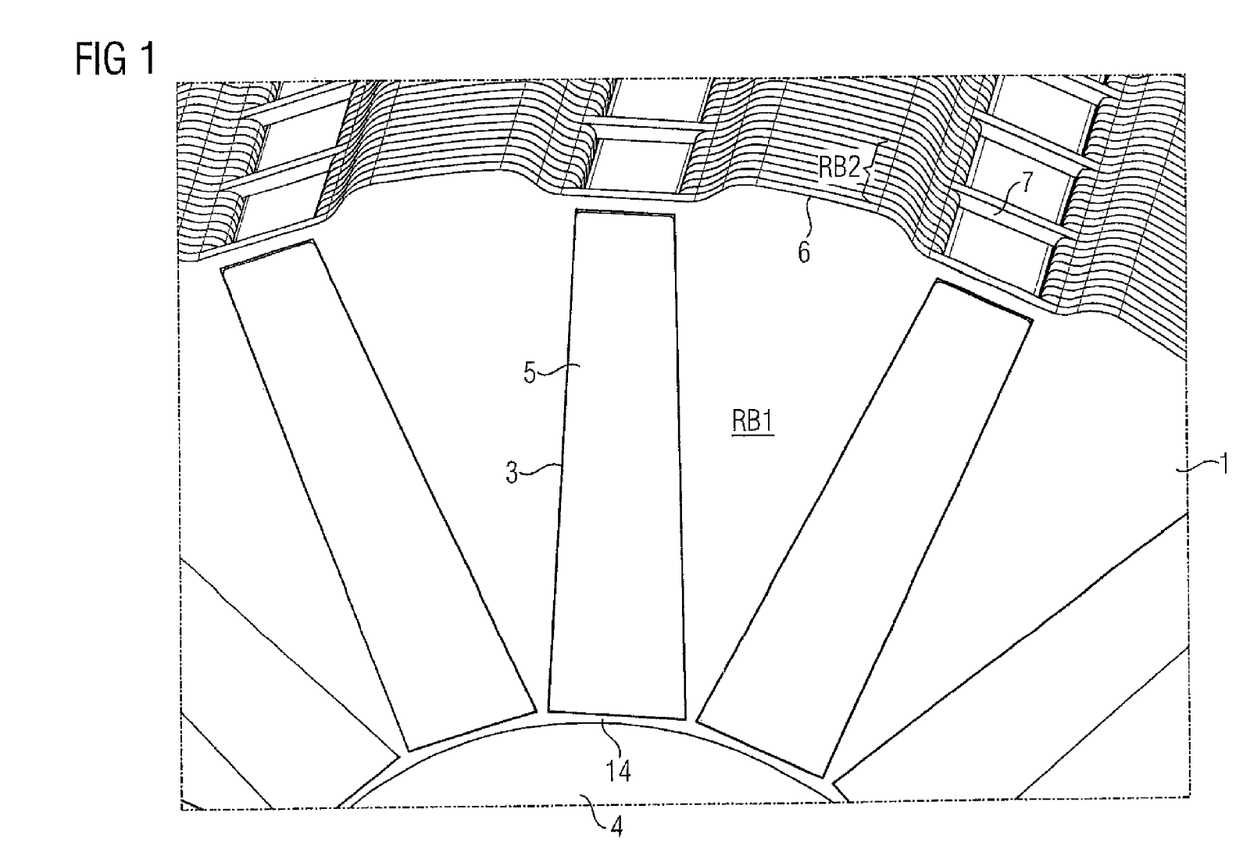
FIGS. 1 to 6 show partial perspective representations of different embodiments of a rotor.

Turning now to the drawing, and in particular to FIG. 1, there is shown a partial perspective representations of a first embodiment of a rotor 1 according to the present invention. The rotor 1 is arranged on a shaft 4 and includes plates RB1 and RB2 arranged in an axially layered manner. The plates RB1 are closed both in terms of their outer contour 6 and also in terms of their inner contour 14. I.e. this layer of a laminated core 2 of a rotor 1 contains a one-piece plate. The next layer of the laminated core 2 comprises, when viewed in the peripheral direction, a number of plate segments RB2. The axially following layers are embodied similarly. When viewed in the peripheral direction, poles running axially are now formed, wherein pockets, in which permanent magnets 5 are located are embodied running axially between the plate segments. The axial pockets are formed in interspaces between the plate segments RB2 and recesses formed radially within the outer contour of the first plate segment RB1. The permanent magnets 5 are distanced from the shaft 4 by the webs 14 of the plates RB1 in the region of the plate segments of RB2.

Defined adhesive gaps 8 are formed there, which are filled with a suitable adhesive in order to fix the permanent magnets 5 in the pockets. The radial height of the adhesive gap 8 is determined by the radial height of the web 14. The outer contour of the overall laminated core 2 is identical in the region of the magnetic pole irrespective of the plates RB1 and RB2.

The permanent magnets 5 are, as shown in this representation, embodied to be trapezoid in terms of their cross-section. The flux concentration thus particularly advantageously produces an inventively configured laminated core of the rotor 1.

With a laminated core 2 of the rotor 1, both the first plate of the laminated core and also the last plate of the laminated core are advantageously provided with an RB1 plate. This structure is used to compact the laminated core 2.

Figure 2:
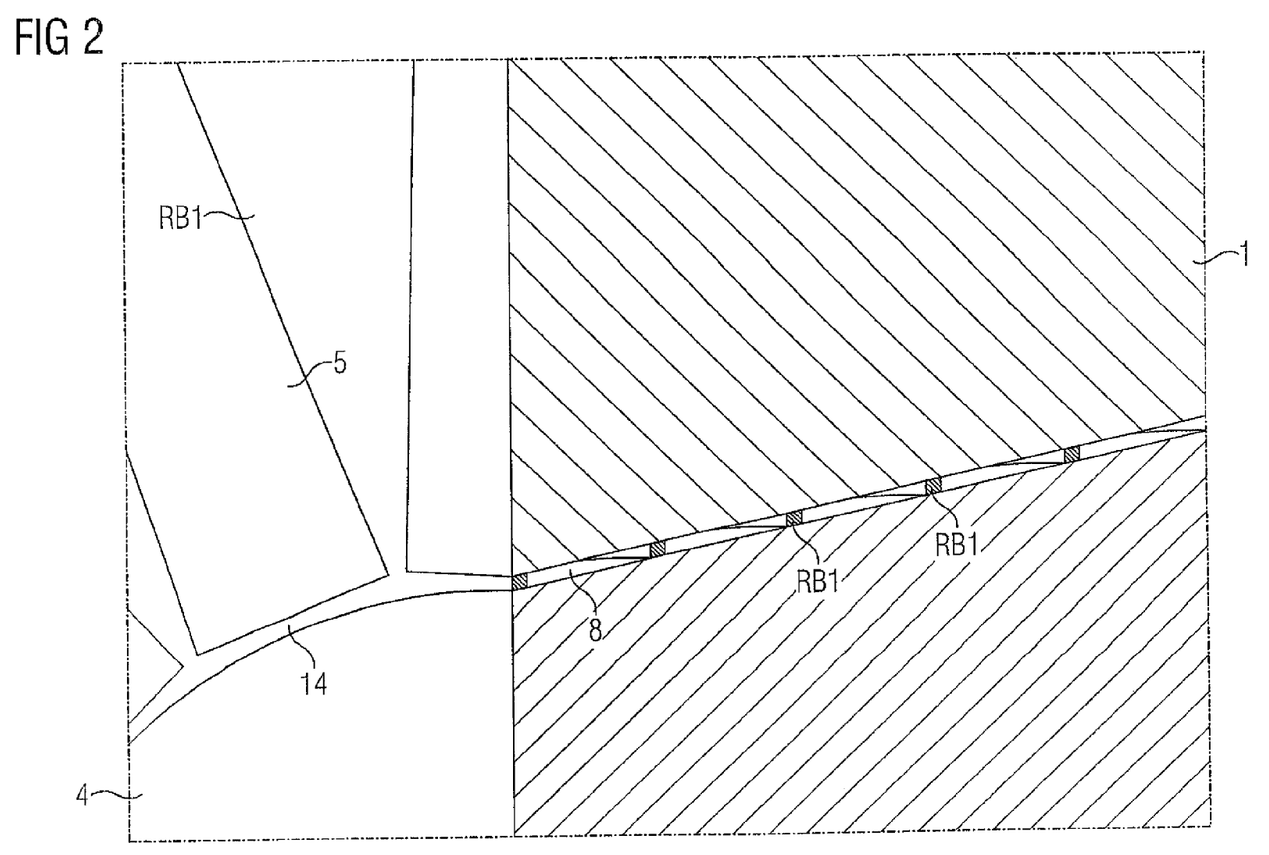

In the same embodiment, FIG. 1 now shows that in addition to the radial adhesive gaps 3 between the plates RB2 and the permanent magnets 5, a tangential adhesive gap 8 is also formed radially below the permanent magnets 4 between the permanent magnets 5 and the shaft 4. It is particularly clear in this representation and FIG. 2 that the laminated core 2 only has contact with the shaft 4 via the plate RB1.

In a further embodiment (not shown in more detail), a laminated core 2 of the rotor 1 can also be conceived, in which the axial layering arrangement takes place from one-piece plates made in each instance. Two plate types which differ geometrically are provided here per laminated core 2. The one type comprises a closed web on its outer contour, while the other plate only comprises a closed web on its inner contour. Pockets running axially are thus likewise created by a predeterminable layering arrangement of these two one-piece plate types for receiving permanent magnets 5. Adhesive gaps 8 are now created here between the plates with a closed outer contour and the shaft 4.

Figure 3:
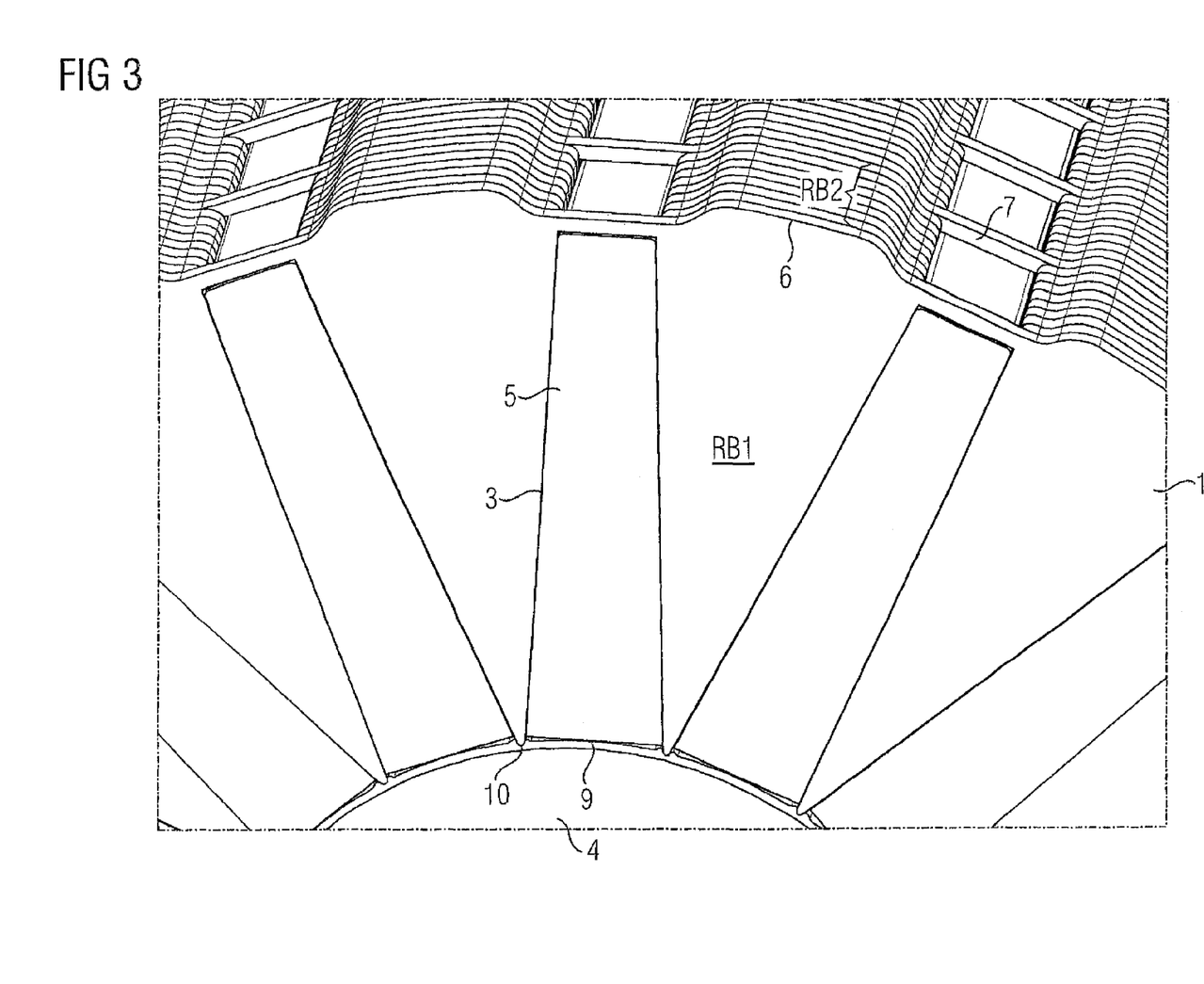
Figure 4:
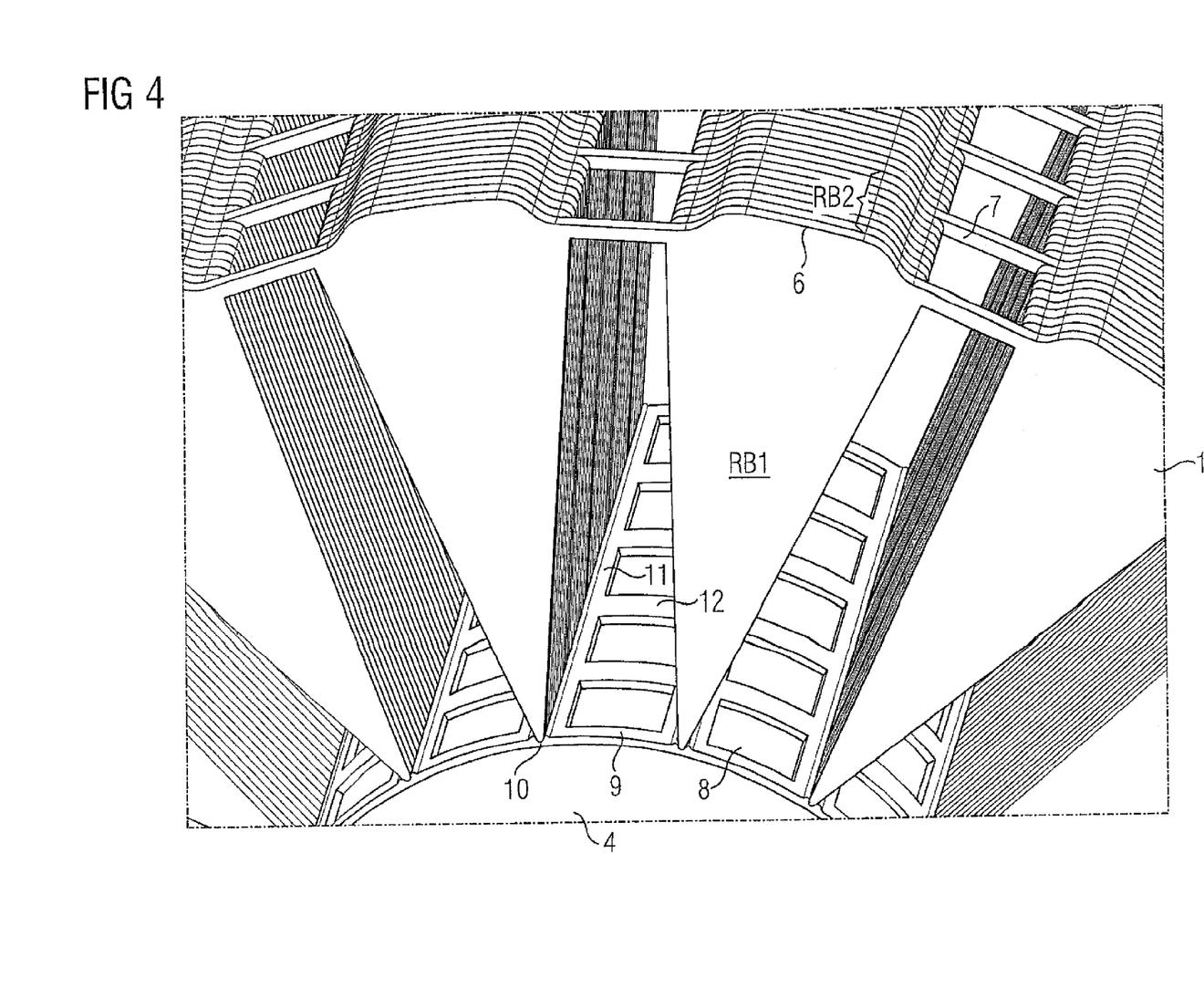

FIG. 3 shows a further exemplary embodiment in which a sleeve 9 is provided in particular between shaft 4 and the laminated core 2, which, as is also clearer from FIG. 4, provides tangential adhesive gaps between the permanent magnet 5 and the shaft 4. The sleeve 9 is formed here in particular by webs 11 running axially and the webs 12 running axially in the peripheral direction. The plates RB1 and the plate segments RB2 are advantageously fixed and positioned here on the axial webs 11 in a slot 10. In this embodiment, the plates RB1 only comprise a mechanical connection—i.e. a web 7, on their outer contour.

The axial distance of the webs 7 and the webs 12 of the sleeve 9 can be identical, and can be suited to the requirements of the rotor structure. Depending on the adhesive quantity required for the permanent magnets 5, the webs 12 are measured both in terms of their axial distance and also in terms of their radial height.

The axial distance of the webs 7 is inter alia measured in terms of the required centrifugal force stress.

Figure 5:
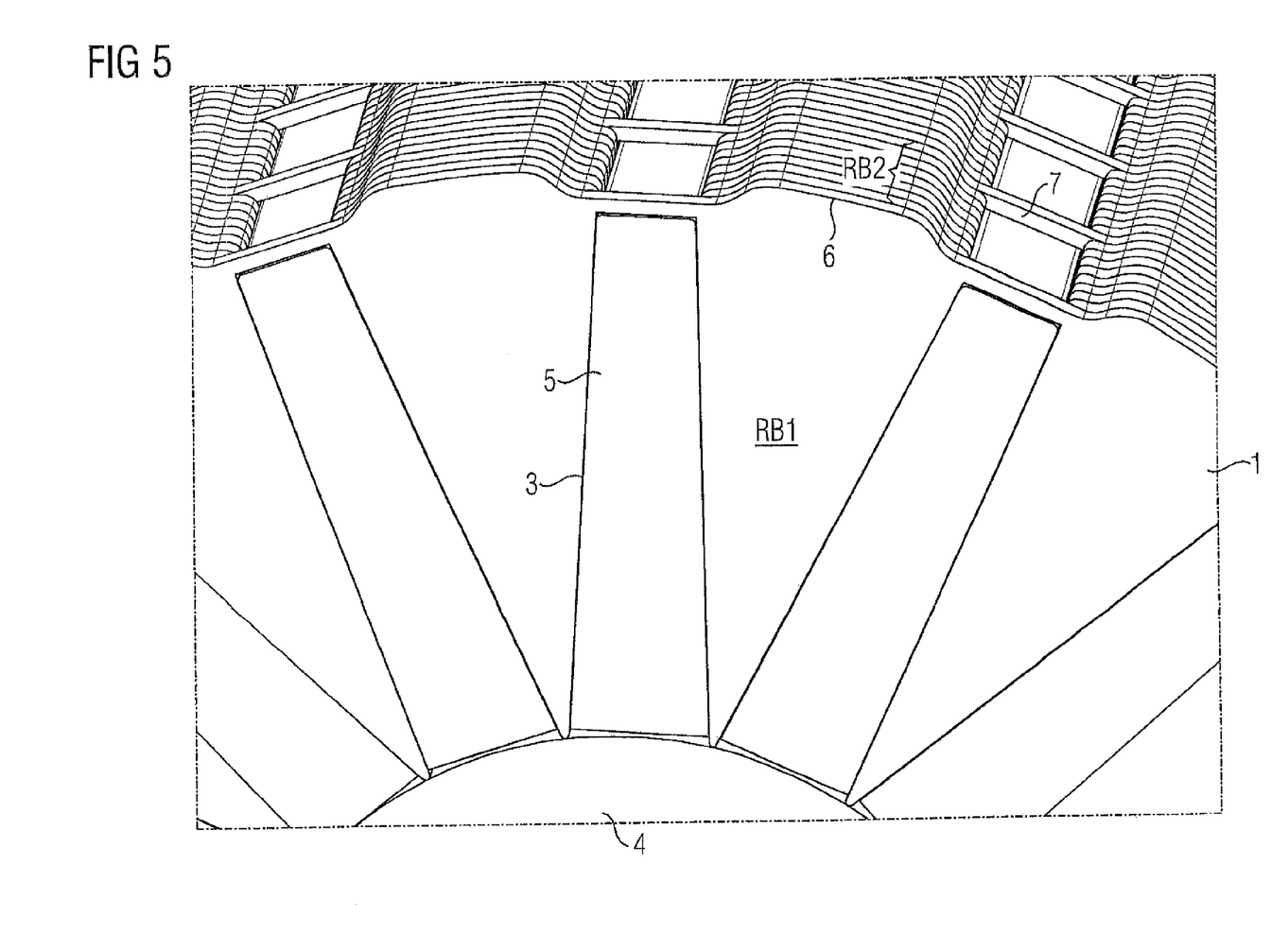
Figure 6:
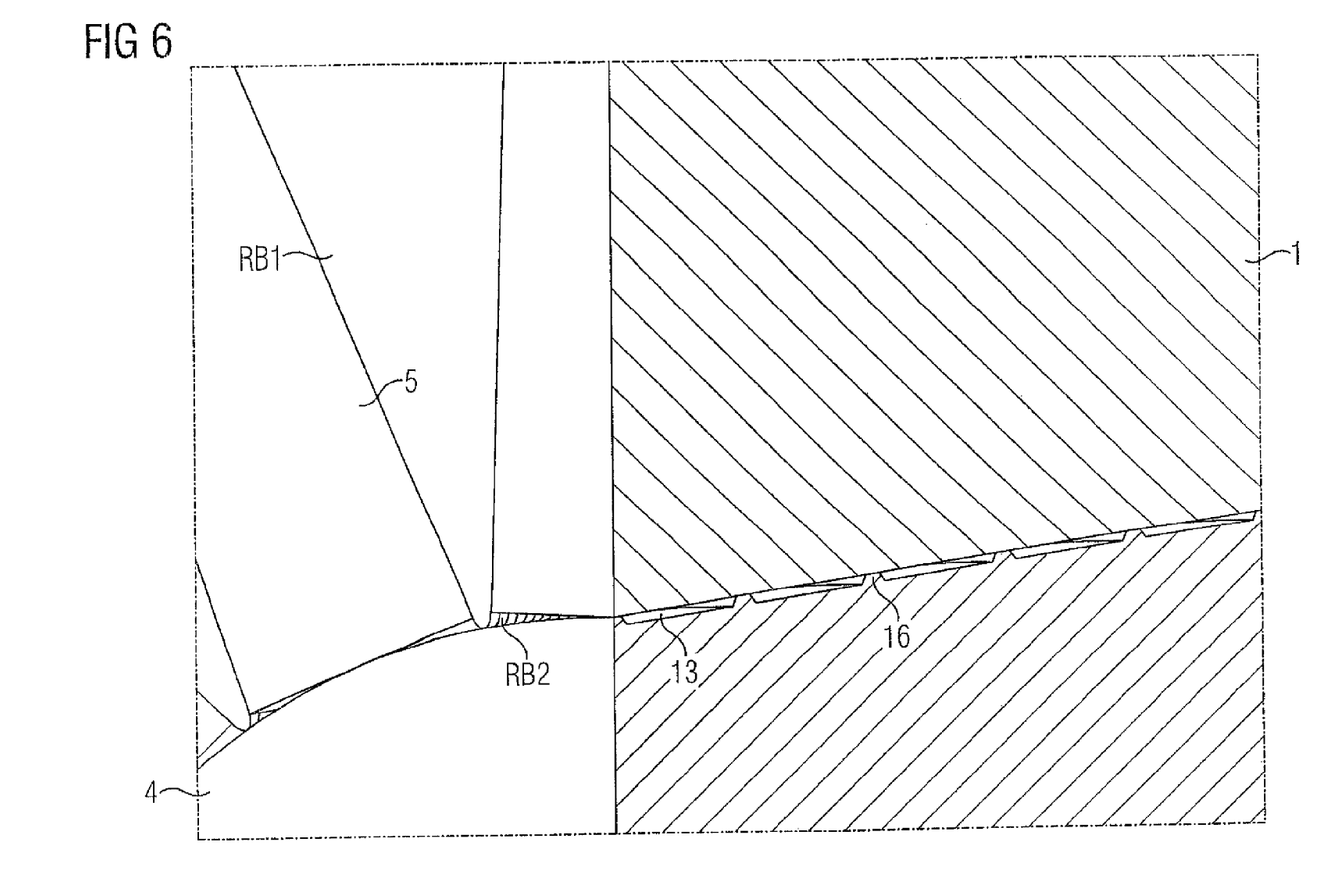

In a further embodiment according to FIG. 5, the tangential adhesive gaps 8 are now achieved in that the shaft 4 comprises annular grooves 13 (FIG. 6), so that the permanent magnets 5 now rest on the remaining webs 16 of the shaft 4. Tangential adhesive gaps 8 are thus produced in sections. Otherwise, the structure of the laminated core 2 does not differ from that of the embodiment according to FIG. 3 and FIG. 4.

Such a rotor 1 is particularly advantageous for permanently excited synchronous machines 22 with comparatively high rotational speeds. Furthermore, permanent synchronous motors 22 of this type can also be used in traction vehicles, such as for instance rail vehicles or E-cars.

Figure 7:
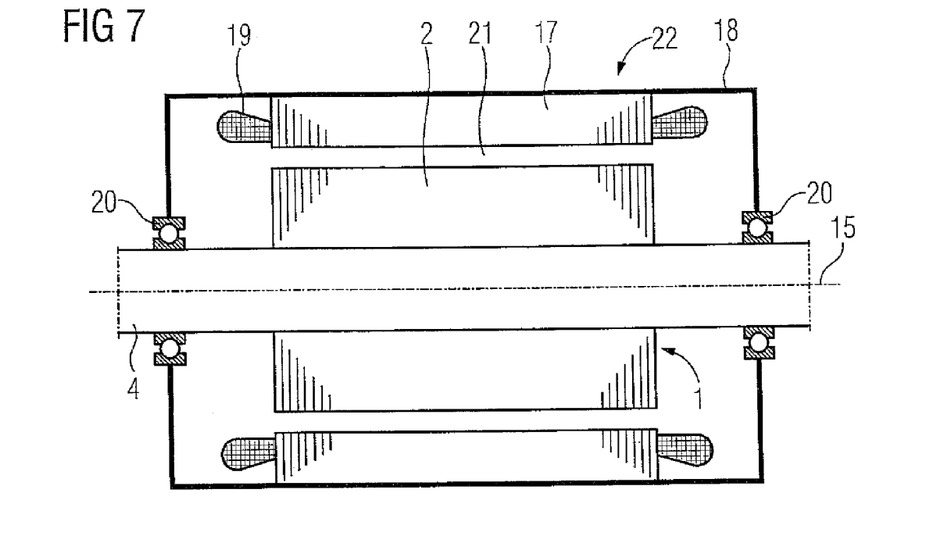
FIG. 7 shows a basic structure of a permanently excited synchronous motor in longitudinal section.

A permanently excited synchronous machine 22 of this type according to FIG. 7 for instance comprises a stator 17, in the grooves of which a winding system 19 is arranged. During operation of the permanently excited synchronous machine 22, the shaft 4 is driven and/or electrical energy generated by the electromagnetic interaction of the stator 17 with the rotor 1 across an air gap 21. The shaft 4 is supported here by way of a bearing 20 on a housing 18.

Figure 8:
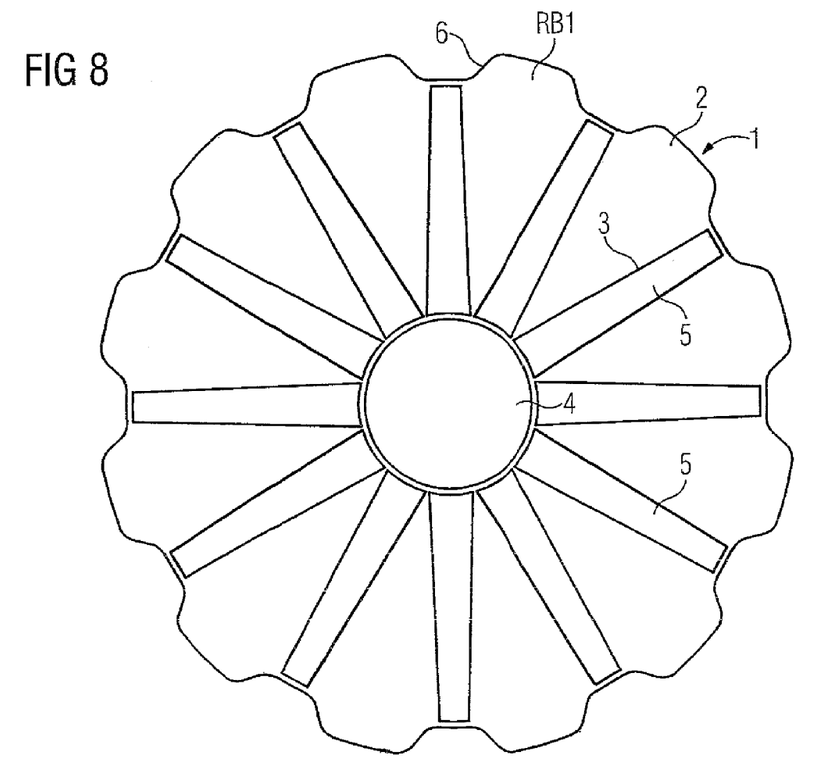
FIG. 8 shows a cross-section of a rotor.

FIG. 8 shows a cross-section of a rotor 1 having twelve poles, wherein the permanent magnets 5 are arranged in flux concentration. The outer contour of the rotor 1 is designed here such that an approximately sinusoidal course of the air gap field is produced. This is achieved in that the air gap 21 has lower radial dimensions in the region of the pole, than is the case in the region of the permanent magnets 5.

The air gap 21 in the pole center is advantageously the smallest radial dimension here, while the radial distance increases toward the pole edges.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rotor of a permanently excited synchronous machine, said rotor comprising:
   a shaft capable of rotating about an axis;
   a laminated core having an axial layering arrangement defined by planes which are aligned perpendicular to the axis, said laminated core including at least two layers which are configured to be geometrically different, with a first one of the layers having a plate with a closed outer contour at least at an outer periphery, and with a second one of the layers having plural plate segments, said first and second layers of the laminated core being arranged in an axial direction to form axial pockets in interspaces between the plate segments of the second layer and recesses formed radially within the outer contour of the first layer;

permanent magnets received in the pockets; and an adhesive provided in radial gaps formed at least in axial sections of the second layer between adjacent plate segments and the permanent magnets.

2. The rotor of claim 1, wherein the segment of the other one of the layer are in particular, similar plate segments.

3. The rotor of claim 1, wherein the axial sections of the second layer has tangential adhesive gaps between the permanent magnets and the shaft.

4. The rotor of claim 1, further comprising a substantially cylindrical sleeve provided between the laminated core and the shaft and having a casing formed with recesses, at least in one section, radially below the permanent magnets, for establishing tangential adhesive gaps between the permanent magnets and the shaft.

5. The rotor of claim 4, wherein the sleeve has webs which run in the axial direction and in a peripheral direction.

6. The rotor of claim 5, wherein the webs of the sleeve have each at least one slot for fixing the plate of the first layer.

7. The rotor of claim 1, wherein the permanent magnets are arranged in flux concentration, said rotor having at least a number of poles 2p>10.

8. The rotor of claim 1, wherein the permanent magnets have a trapezoid cross-section.

9. The rotor of claim 1, wherein the first layer has an inner contour, which rests on the shaft or a sleeve to thereby form a closed pocket when viewed in a peripheral direction.

10. The rotor of claim 1, wherein the shaft has annular grooves to provide tangential adhesive gaps.

11. The rotor of claim 10, wherein the annular grooves are formed in an axial region of the plate segments of the second layer.

12. The rotor of claim 1, wherein the permanent magnets are configured as hard ferrite.

13. A permanently excited synchronous machine, comprising a rotor which includes a shaft capable of rotating about an axis, a laminated core having an axial layering arrangement defined by planes which are aligned perpendicular to the axis, said laminated core including at least two layers which are configured to be geometrically different, with a first one of the layers having a plate with a closed outer contour at least at an outer periphery, and with a second one of the layers having plural plate segments, said first and second layers of the laminated core being arranged in an axial direction to form axial pockets in interspaces between the plate segments of the second layer and recesses formed radially within the outer contour of the first layer, permanent magnets received in the pockets, and an adhesive provided in radial gaps formed at least in axial sections of the second layer between adjacent plate segments and the permanent magnets.

14. An electrically driven vehicle, comprising: at least one permanently excited synchronous machine having a rotor which includes a shaft capable of rotating about an axis, a laminated core having an axial layering arrangement defined by planes which are aligned perpendicular to the axis, said laminated core including at least two layers which are configured to be geometrically different, with a first one of the layers having a plate with a closed outer contour at least at an outer periphery, and with a second one of the layers having plural plate segments, said first and second layers of the laminated core being arranged in an axial direction to form axial pockets in interspaces between the plate segments of the second layer and recesses formed radially within the outer contour of the first layer, permanent magnets received in the pockets, and an adhesive provided in radial gaps formed at least in axial sections of the second layer between adjacent plate segments and the permanent magnets.

\* \* \* \* \*